May 17, 1927.
C. A. MARWAHN
1,629,403
CONVERTIBLE VEHICLE BODY
Filed April 10, 1924
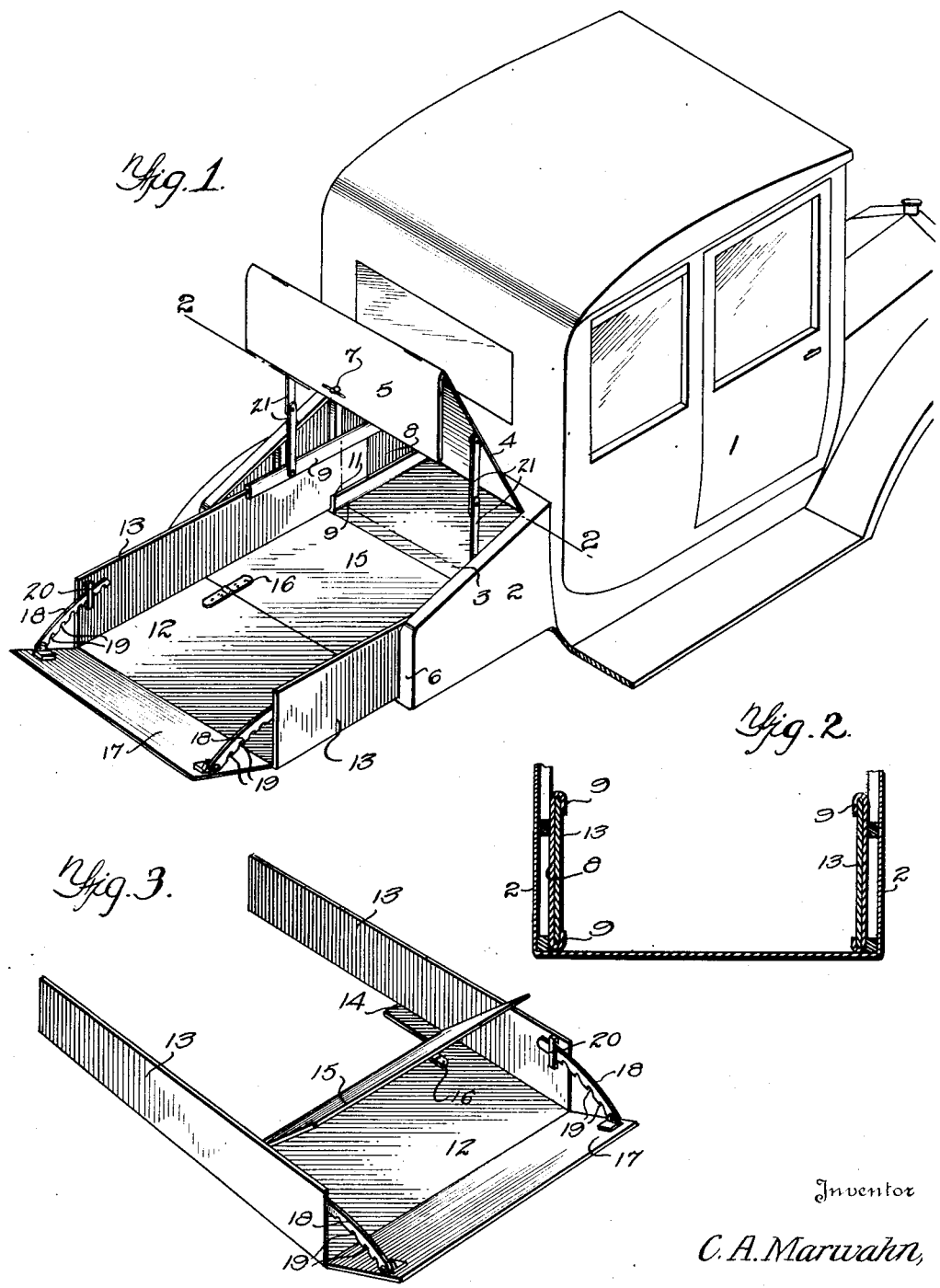
Inventor
C. A. Marwahn,
By
Attorney Patented May 17, 1927.

1,629,403

UNITED STATES PATENT OFFICE.

CARL ANTON MARWAHN, OF OSHKOSH, WISCONSIN.

CONVERTIBLE VEHICLE BODY.

Application filed April 10, 1924. Serial No. 705,696.

This invention relates to convertible vehicle bodies and more particularly to a body adapted to be converted from a passenger vehicle to a light delivery truck.

An object of the invention is the provision of a vehicle consisting of a coupé or roadster body having a rear compartment adapted to be closed to present a normal appearance and having a truck body arranged therein adapted to be placed in an extended position when desired.

A further object of the invention is to provide means for supporting the truck body whereby it may be readily moved from an opened or closed position to convert the vehicle from one form to another.

A further object of the invention is the provision of supporting means for the auxiliary truck body arranged at the sides, so as not to reduce the capacity of the truck body.

In the accompanying drawings, I have shown one embodiment of the invention. In this showing:

Figure 1 is a perspective view of a vehicle body showing the invention applied and showing the truck body in extended position, Figure 2 is a vertical sectional view substantially on line 2—2 of Figure 1, and, Figure 3 is a perspective view of the truck body removed.

Referring to the drawings, the reference numeral 1 designates a vehicle body of ordinary construction. In the drawings, I have shown a vehicle body of the coupé type but the invention may be applied to a roadster or other type of single seat vehicle in which a rear compartment for the storage of luggage is generally provided. The rear compartment is shown at 2, and is provided with an inclined upper surface 3. This compartment is provided with an opening closed by a hinged door or gate 4. The door or gate is provided with an extension 5, adapted to fit over the rear portion 6 of the compartment. A suitable catch or lock 7 may be arranged on the extension.

The device forming the subject matter of the present invention consists of a truck body adapted to be arranged within the rear compartment 2 and which may be closed within the compartment when desired, or arranged in the extended position shown in the drawings. As shown, guides consisting of plates 8 are arranged on opposite sides of the rear compartment and these guides are provided with upper and lower flanges 9. As shown, the upper flange extends to a point adjacent the rear 6 of the vehicle and the lower flange terminates inwardly of the rear of the vehicle, as at 11. The truck body consists of a bottom 12 and sides 13. The sides extend inwardly beyond the bottom, as shown in Figure 3 of the drawings. Adjacent its inner end, the bottom is provided with a cut out portion forming side members 14, and an auxiliary bottom 15 is hinged to the inner edge of the bottom by means of hinges 16. The auxiliary bottom is of substantially the same width as the main bottom and when in lowered position is adapted to rest upon the side members 14. A gate 17 is arranged on the rear of the truck body and this gate is provided with curved arms 18 having notches or teeth 19 on their inner edges. These arms pass through clips 20 to support the gate at any desired angle.

The cover is connected to the sides by means of links 21, pivotally connected to each other and to the cover and sides respectively to retain the cover in the raised position shown in Figure 1 of the drawings when the auxiliary truck bottom is in use.

The operation of the device will be apparent from the foregoing description. When the vehicle is used as a passenger vehicle, the truck body is moved inwardly into the compartment 2 and the door 4—5 closed. The vehicle then presents the appearance of an ordinary passenger vehicle. When the vehicle is to be used for light hauling, the door 4—5 is opened and the truck body moved outwardly to the extended position shown. Any suitable means may be employed to limit the outward movement of the truck body to prevent accidental removal from the vehicle due to vibration when the vehicle is running. The auxiliary bottom is adapted to cover any open spaces in the bottom of the compartment 2 when the truck body is slid outwardly. When the truck body is in its inner position, the auxiliary bottom is adapted to be turned over on top of the bottom 12 to provide clearance for the rear axle and springs of the vehicle.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. An extension body for motor vehicles having a rear storage compartment including side walls, comprising longitudinally exending guides adapted to be secured to the inner portions of the side walls of the storage compartment, said guides being provided with flanges at their upper and lower edges, and an auxiliary truck body adapted to be arranged in said compartment and slidable in said guides, said body being movable inwardly wholly within said storage compartment to inoperative position and movable rearwardly to partially extend outwardly from the storage compartment in an operative position, said body comprising a bottom and side walls, and an auxiliary bottom hinged at its rear end to the forward end of said bottom and normally forming a continuation thereof when said truck body is in operative position, a portion of the forward end of said bottom when in operative position being arranged to contact with one of said lower flanges to prevent inward sliding movement of said truck body, said auxiliary bottom being adapted to swing rearwardly to a position wholly above said first named bottom to permit said truck body to slide inwardly to inoperative position.

2. An extension body for motor vehicles having a rear storage compartment including side walls, comprising longitudinally extending guides adapted to be secured to the inner portions of the side walls of the storage compartment, said guides being provided with flanges at their upper and lower edges, and an auxiliary truck body adapted to be arranged in said compartment and slidable in said guides, said body being movable inwardly wholly within said storage compartment to inoperative position and movable rearwardly to partially extend outwardly from the storage compartment in an operative position, said body comprising a relatively short bottom and relatively long side walls projecting forwardly a substantial distance beyond said bottom, said bottom being provided at its forward edge with extensions connected to the side walls of the truck body, and an auxiliary bottom substantially equal in width to the space between the side walls of said truck body and hinged at its rearward edge to the forward edge of the bottom of said truck body, said auxiliary bottom being adapted to assume a substantially horizontal operative position forwardly of said bottom and resting upon the extensions thereof, the rear ends of the lower of said flanges terminating a substantial distance forwardly of the rear ends of the upper of said flanges and adapted to contact with the forward edge of said auxilary bottom when the latter is in operative position to prevent forward movement of said truck body.

In testimony whereof, I affix my signature.

CARL ANTON MARWAHN.